United States Patent
Nguyen

(10) Patent No.: US 9,063,589 B2
(45) Date of Patent: Jun. 23, 2015

(54) TOUCHSCREEN STYLUS

(71) Applicant: Nguyen Nguyen, Chicago, IL (US)

(72) Inventor: Nguyen Nguyen, Chicago, IL (US)

(*) Notice: Subject to any disclaimer, the term of this patent is extended or adjusted under 35 U.S.C. 154(b) by 213 days.

(21) Appl. No.: 13/854,647

(22) Filed: Apr. 1, 2013

(65) Prior Publication Data

US 2014/0292707 A1    Oct. 2, 2014

(51) Int. Cl.
    *G06F 3/033*    (2013.01)
    *G06F 3/0354*   (2013.01)
    *G06F 3/044*    (2006.01)

(52) U.S. Cl.
    CPC ............ *G06F 3/03545* (2013.01); *G06F 3/044* (2013.01)

(58) Field of Classification Search
    CPC . G06F 3/03545; G06F 3/044; G06F 3/03546; G06F 3/0383; G06F 3/045
    USPC .......... 345/158, 173–174, 179, 104; 178/19.01, 19.03, 19.04; 81/9.2; 349/12
    See application file for complete search history.

(56) References Cited

U.S. PATENT DOCUMENTS

| | | |
|---|---|---|
| 3,501,225 A | 3/1970 | Martin et al. |
| 3,951,555 A | 4/1976 | Wittnebert et al. |
| 5,488,204 A | 1/1996 | Mead et al. |
| 5,543,588 A | 8/1996 | Bisset et al. |
| 5,635,682 A | 6/1997 | Cherdak et al. |
| 5,694,154 A | 12/1997 | Knox et al. |
| 5,706,028 A * | 1/1998 | Murakami et al. ............ 345/157 |
| 5,877,459 A | 3/1999 | Prater et al. |
| 5,912,662 A * | 6/1999 | Bunn et al. .................... 345/179 |
| 5,913,629 A | 6/1999 | Hazzard et al. |
| 5,939,702 A | 8/1999 | Knighton et al. |
| 6,050,735 A | 4/2000 | Hazzard et al. |
| 6,225,988 B1 | 5/2001 | Robb |
| 6,249,277 B1 | 6/2001 | Varveris |
| 6,390,706 B1 | 5/2002 | Yokouchi et al. |
| 6,439,791 B1 | 8/2002 | Takeuchi et al. |
| 6,626,598 B2 | 9/2003 | Schneider |

(Continued)

FOREIGN PATENT DOCUMENTS

| | | |
|---|---|---|
| CN | 201214341 Y | 4/2009 |
| CN | 201592588 U | 9/2010 |

(Continued)

OTHER PUBLICATIONS iPad stylus,iPhone stylus, DAGi transparent accurate capacitive stylus, Jul. 13, 2013 - http://www.dagi-stylus.com/us/.

(Continued)

*Primary Examiner* — Lun-Yi Lao
*Assistant Examiner* — Peter D McLoone
(74) *Attorney, Agent, or Firm* — James P. Muraff; Neal, Gerber & Eisenberg LLP

(57) ABSTRACT

A stylus instrument for interfacing with a capacitive touchscreen of an electronic device. According to certain aspects, the stylus instrument includes a body portion and a tip portion with a ring connected thereto and supported at an angle relative to the body portion. The tip portion includes a pointer extending therefrom and aligned to point at the center of the ring. The ring includes a conductive contact surface configured to activate sensors of the capacitive touchscreen and accordingly facilitate functionalities of the electronic device. The configuration of the stylus instrument enables a user a precise visual guide in selecting and facilitating the functionalities of the device with a reduced amount of friction as a result of a void at or near the center of the ring.

7 Claims, 2 Drawing Sheets

(56) References Cited

U.S. PATENT DOCUMENTS

| | | | |
|---|---|---|---|
| 7,046,230 | B2 | 5/2006 | Zadesky et al. |
| 7,232,271 | B2 | 6/2007 | Adams |
| 7,567,242 | B2 | 7/2009 | Perkins et al. |
| 7,607,849 | B2 | 10/2009 | Barker |
| D669,898 | S | 10/2012 | Nakata |
| 8,384,697 | B2 * | 2/2013 | Sung ............................ 345/179 |
| 8,508,510 | B2 * | 8/2013 | Kim ............................. 345/179 |
| 8,830,212 | B2 * | 9/2014 | Vaganov ....................... 345/179 |
| 8,866,798 | B2 * | 10/2014 | Zeliff et al. .................... 345/179 |
| 2005/0286962 | A1 | 12/2005 | Cheng |
| 2006/0062628 | A1 | 3/2006 | Kostecki et al. |
| 2006/0239761 | A1 | 10/2006 | Cetera |
| 2007/0126716 | A1 | 6/2007 | Haverly |
| 2008/0030486 | A1 | 2/2008 | Cook |
| 2008/0297491 | A1 | 12/2008 | Adkins |
| 2009/0035050 | A1 * | 2/2009 | Ramos .......................... 401/131 |
| 2009/0262637 | A1 | 10/2009 | Badaye et al. |
| 2009/0266626 | A1 | 10/2009 | Robb |
| 2009/0314552 | A1 | 12/2009 | Underwood et al. |
| 2009/0315864 | A1 | 12/2009 | Silverbrook et al. |
| 2010/0006350 | A1 * | 1/2010 | Elias .......................... 178/18.06 |
| 2010/0021022 | A1 | 1/2010 | Pittel et al. |
| 2010/0214252 | A1 | 8/2010 | Wu |
| 2010/0225614 | A1 * | 9/2010 | Sung ............................ 345/174 |
| 2011/0096042 | A1 | 4/2011 | Raif et al. |
| 2011/0096044 | A1 | 4/2011 | Raif et al. |
| 2011/0210931 | A1 | 9/2011 | Shai |
| 2011/0298709 | A1 * | 12/2011 | Vaganov ....................... 345/158 |
| 2012/0026127 | A1 * | 2/2012 | Kim ............................. 345/174 |
| 2012/0098798 | A1 | 4/2012 | Lee |
| 2012/0327044 | A1 * | 12/2012 | Zeliff et al. .................... 345/179 |
| 2012/0327046 | A1 * | 12/2012 | Sung ............................ 345/179 |
| 2013/0002606 | A1 * | 1/2013 | Mann ............................ 345/174 |
| 2013/0038579 | A1 | 2/2013 | Boyd et al. |
| 2014/0160091 | A1 * | 6/2014 | Mann ............................ 345/179 |
| 2014/0168172 | A1 * | 6/2014 | Zeliff et al. .................... 345/179 |
| 2014/0362022 | A1 * | 12/2014 | Latella et al. ................. 345/174 |

FOREIGN PATENT DOCUMENTS

| | | |
|---|---|---|
| JP | 10161795 | 6/1998 |
| JP | 11134103 A | 5/1999 |
| JP | 2012053681 A | 3/2012 |
| KR | 1020100094914 A | 8/2010 |
| KR | 100990755 B1 | 10/2010 |
| KR | 1020110105500 A | 9/2011 |
| WO | 2005119420 A1 | 12/2005 |
| WO | 2011008533 A2 | 1/2011 |
| WO | 2012058230 A1 | 5/2012 |

OTHER PUBLICATIONS

A stationery to define the future—Dreamer stylus by Simon Brown + Wei Du :: Kicktraq Jul. 13, 2013—http://www. kicktraq.com/projects/1795526358/a-stationery-to-define-the-future-dreamer-stylus/.

Jot: Capacitive Touch Stylus by Adonit! by Adonit — Kickstarter, Jul. 13, 2013—http://www.kickstarter.com/ projects/531383637/jot-capacitive-touch-stylus.

oStylus—Capacitive Drawing Stylus—Jul. 13, 2013—http://ostylus.com/.

Discover Projects >> Search—Kickstarter Jul. 13, 2013—http://www.kickstarter.com/projects/search?term=stylus.

Tech & Accessory News—Gadgetmac—Jul. 13, 2013—http://gadgetmac.com/news/tag/stylus.

* cited by examiner

TOUCHSCREEN STYLUS

FIELD

This application generally relates to electronic device accessories. In particular, the application relates to a stylus for providing input to a capacitive touchscreen.

BACKGROUND

Existing electronic devices incorporate capacitive touchscreen technology whereby the electronic devices receive input via sensing contact with a conductive object, such as a human finger or a conductive stylus. While a human finger can effectively navigate among various features of the software or operating system of the electronic devices, users tend to employ styli to accomplish more precise functions supported by the electronic devices, such as those in drawing applications, note-taking applications, or other productivity or content consumption-related features.

Various current styli on the market employ a contact surface composed of a conductive rubber or silicone-like material that is attached to a metal body. In some cases, the diameter of the contact surface must be large enough to activate a requisite amount of sensors of the touchscreen and to effectively constitute a touch event. However, the large diameter of the contact surface prevents the user from being able to adequately see or otherwise visualize the center of the stylus' interaction with the touchscreen. Although some styli offer transparent contact surfaces, some styli have contact surfaces which generate a large amount of friction with the touchscreen, such as those with rubber and silicone, thereby impeding smooth interaction abilities. Additionally, although some styli offer a pivoting ring as a contact surface, the pivoting ring does not offer ample support during use, and can easily break, and also does not provide an adequate focal point for the user to leverage during interaction with the touchscreen, making it harder to visualize the center.

Accordingly, there is an opportunity for a stylus that offers a supported contact surface and that enables a user to effectively gauge an interaction with a touchscreen.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
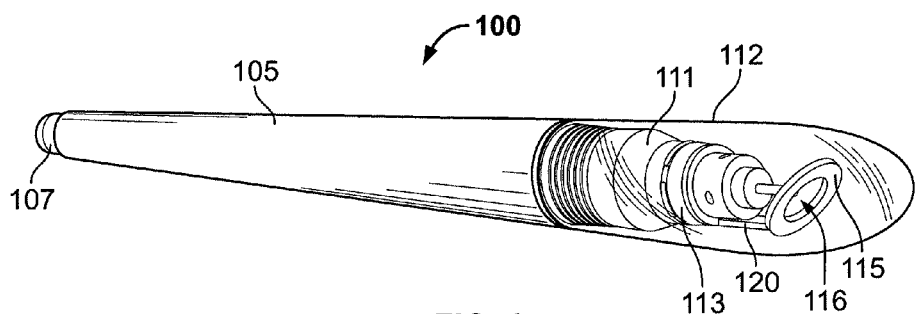
FIG. 1 is a perspective view of a stylus instrument in accordance with some embodiments.

A stylus instrument 100 is depicted in FIG. 1. The stylus instrument 100 includes a body portion 105 that is capable of being gripped by a user. The body portion 105 can have a tip portion 111 attached thereto. As shown in FIG. 1, the body portion 105 can optionally include an end tip 107. According to embodiments, the body portion 105 and the tip portion 111, including the end tip 107, are composed of conductive materials such as, for example, one or more metals or metal alloys, graphite, carbon fiber, compounds which have conductive characteristics, such as conductive plastics, and/or others. The tip portion 111 can be attached to the body portion 105 via conventional methods such as adhesion, a threaded screw, friction, or others. In some embodiments, the body portion 105 can be divided into multiple segments or components. As shown in FIG. 1, the body portion 105 can optionally have a cap 112 attached thereto and capable of covering the tip portion 111. Alternatively, a conductive fabric cover could be used to cover the end tip 107 and/or tip portion 111.

As shown in FIG. 1, the tip portion 111 can include a support component 113 extending therefrom and a connector 120 extending from the support component 113. The connector 120 can have a ring 115 attached thereto. In embodiments as shown, the connector 120 can rigidly extend from the support component 113 in a perpendicular fashion, however it should be appreciated that other configurations of the support component 113 and the connector 120 are envisioned. The connector 120 can be composed of a conductive material or combination of conductive materials such as, for example, one or more metals or metal alloys, graphite, or others. As shown in FIG. 1, the ring 115 includes a void 116 located at or near the center of the ring 115. Although the void 116 is depicted as a circle in FIG. 1, it should be appreciated that the void 116 can be other shapes. Further, although the radius of the void 116 as depicted is approximately the same size as the width of the ring shape of the ring 115, it should be appreciated that other sizes of the void 116 and the ring 115 are envisioned.

Figure 2:
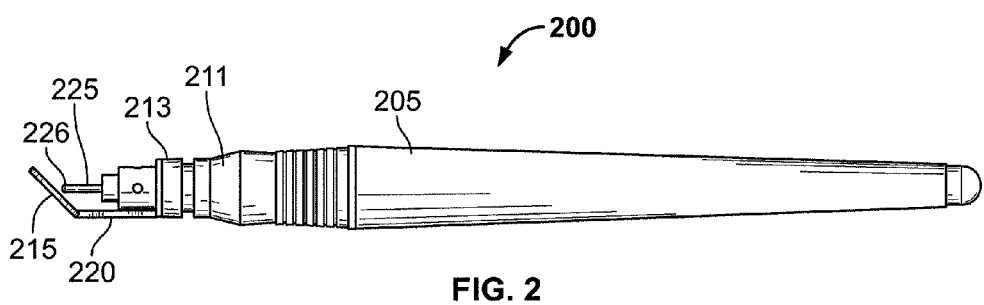
FIG. 2 is a side view of a stylus instrument in accordance with some embodiments.

Referring to FIG. 2, depicted is a side view of a stylus instrument 200 including the same or similar body portion 205, tip portion 211, and support component 213. Similar to the stylus instrument 100 as shown in FIG. 1, the stylus instrument 200 includes a connector 220 extending from the support component 213 and a ring 215 attached to the connector 220. As shown in FIG. 2, the ring 215 is positioned at an angle relative to the connector 220 and the support component 213. It should be appreciated that multiple positioning of the ring 215 at multiple angles are envisioned.

The support component 213 further includes a pointer 225 extending therefrom. In embodiments, the pointer 225 can be shaped as a cylinder, rectangular box, or other shape having a pointed, curved, flat, or other shaped tip. As shown in FIG. 2, the pointer 225 can end at an end point 226 such that there is a space between a plane defined by the ring 215 and the end point 226. Accordingly, in operation, if a user holds the stylus instrument 200 such that the plane defined by the ring 225 is making contact with a surface (e.g., a touchscreen of an electronic device), the end point 226 will not make contact with the surface. The distance of the space between the end point 226 and the plane defined by the ring 215 can vary. For example, the distance can be in a range from just over 0 mm to at least 6 mm.

Figure 3A:
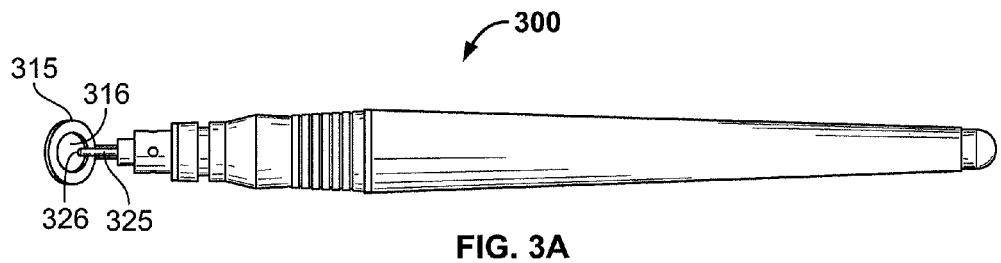
FIG. 3A is a top view of a stylus instrument in accordance with some embodiments.
Figure 3B:
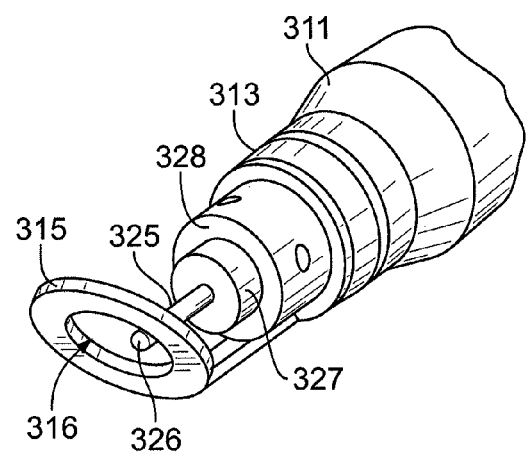
FIG. 3B is a detailed perspective view of a stylus instrument in accordance with some embodiments.

Referring to FIG. 3A, depicted is a top view of a stylus instrument 300 including a similar ring 315, void 316, pointer 325, and end point 326. As shown in FIG. 3A, the end point 326 can be aligned such that the end point 326 is aimed at or points to the center of the void 316, or generally in the direction of the center of the void 316. More particularly, referring to FIG. 3B, the end point 326 can be aligned such that if the pointer 325 were to linearly extend past its end point 326, the pointer 325 would pass through the center, or close to the center, of the void 316. Accordingly, in operation, a user of the stylus instrument 300 can use the pointer 325 as a visual guide to gauge a center point of the void 316. As shown in FIG. 3, the diameter of the pointer 325 can be less than the diameter of the void 316, although it should be appreciated that other dimensions are envisioned.

It should be appreciated that the pointer 325 can attach, fasten, or append to a tip portion 311 via various components. For example, as shown in FIG. 3B, the pointer 325 can attach to various support components 327, 328, 313 of varying sizes and shapes. It should be appreciated that the sizes and shapes of the various support components 327, 328, 313 as well as the pointer 325 can vary.

Figure 4:
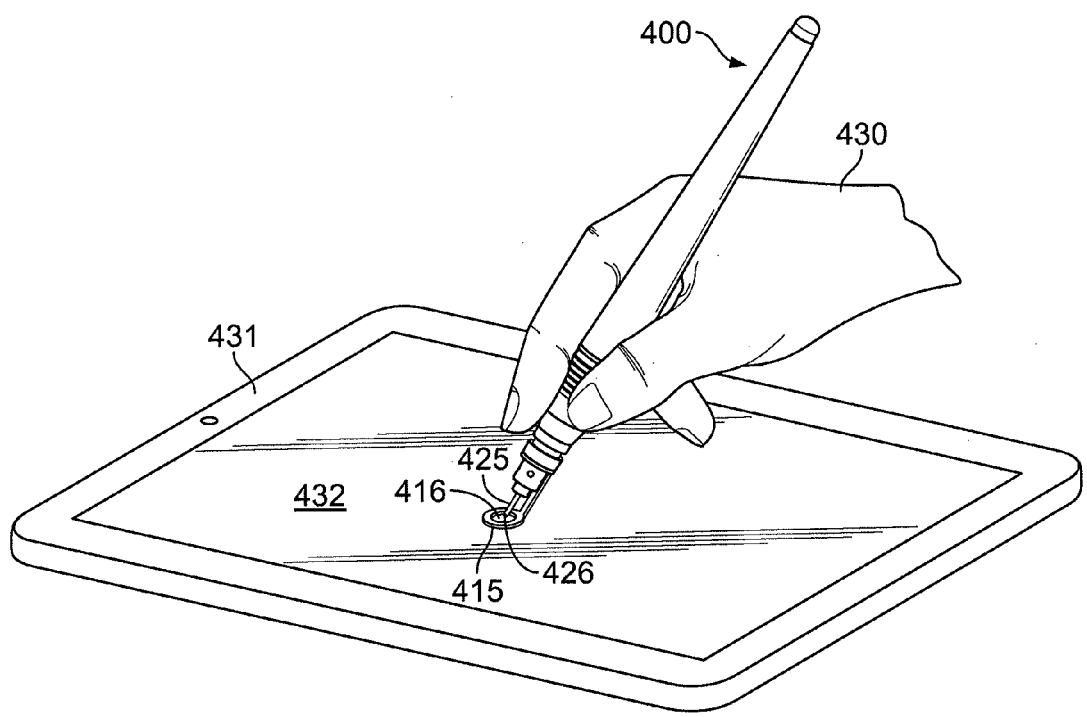
FIG. 4 is a perspective view of a stylus instrument interfacing with a touchscreen in accordance with some embodiments.

Referring to FIG. 4, depicted is a view of a user 430 operating a stylus instrument 400. In particular, the user 430 is operating an electronic device 431 via contacting the stylus instrument 400 with a touchscreen 432 of the device 431. In operation, the touchscreen 432 can be configured with capacitive touch sensors that can be activated via a conductor, such as a ring 415. The various activations of the capacitive touch sensors can initiate and control various applications installed on the device 431, as well as general navigation functionalities of the device 431, as generally known in the art.

According to the present embodiments, the touchscreen 432 can sense contact by the ring 415, and more particularly, the area defined by the ring 415 (i.e., the area enclosed by the circumference of the ring 415). In embodiments, the circumference of the pointer 425 (and an end point 426 of the pointer 425) may not itself be large enough to activate a requisite amount of the capacitive sensors of the touchscreen 432. However, in these embodiments, the contact area defined by the ring 415 can be large enough to activate the corresponding capacitive sensors of the touchscreen 432. Responsive to detecting the contact, a processor of the device 431 can identify a corresponding contact area, and calculate or approximate a center point of the contact area. In the embodiment as shown in FIG. 4, the processor can calculate the center of the contact area defined by the ring 415 to be the center or approximate center of a void 416 of the ring 415. Accordingly, even though the ring 415 makes contact with the touchscreen 432, the "contact point" of the stylus instrument 400 with the touchscreen 432 (for purposes of controlling functionalities of the device 431) is the center of the area defined by the ring 415.

The configuration of the components of the stylus instrument 400 offers many benefits. In particular, because 1) the pointer is aligned with the center of the ring 415 and 2) of the existence of the void 416 of the ring 415, the pointer 425 can offer the user 430 with a guide to visualize the approximate center of the ring 415 (and therefore the calculated "contact point" of the stylus instrument 400 for purposes of interfacing with the touchscreen 432). Further, because 1) the pointer 425 is recessed from the contact area defined by the ring 415 and 2) of the existence of the void 416, the surface area that contacts the touchscreen 432 is reduced and therefore the amount of friction generated by ring 415 contacting the touchscreen 432 is reduced. Moreover, the rigid support of the ring 415 by the connector ensures sufficient control of the stylus instrument 400 during use by the user 430. Accordingly, the stylus instrument 400 offers the user 430 with a precise visual guide in selecting and controlling functionalities of the device 431 without the frictional resistance caused by a large contact area.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A stylus instrument for interfacing with a capacitive touchscreen, the stylus instrument comprising:
   a body portion connected to a ring component via a tip portion, wherein
   the tip portion comprises a connector configured to support the ring component at a fixed angle relative to the body portion, and
   the ring component comprises 1) a void located at or near a center of the ring component and 2) a conductive contact surface configured to activate sensors of the capacitive touchscreen; and
   a pointer component protruding from the tip portion and aligned to point generally toward the center of the ring component, wherein an end point of the pointer component is recessed from a plane area defined by the conductive contact surface of the ring component.

2. The stylus instrument of claim 1, wherein the end point of the pointer component is recessed from the plane area by a distance between 0 and at least 6 millimeters.

3. The stylus instrument of claim 1, wherein the body portion is composed of a conductive material.

4. The stylus instrument of claim 1, wherein a diameter of the pointer component is less than a diameter of the void of the ring component.

5. The stylus instrument of claim 1, wherein the fixed angle is approximately 45 degrees.

6. The stylus instrument of claim 1, wherein a radius of the void is less than yet substantially the same as the width of the ring component, for minimizing material usage and yet still retaining sensitivity to the touchscreen sensors.

7. The stylus instrument of claim 1, wherein the fixed angle can be reset to an angle desired by the user by flexing the instrument to the desired angle.

* * * * *